(12) United States Patent
Takashima et al.

(10) Patent No.: US 12,180,321 B2
(45) Date of Patent: Dec. 31, 2024

(54) MONOMER COMPOSITION FOR CONTACT LENSES, POLYMER FOR CONTACT LENSES AND METHOD FOR PRODUCING SAME, AND CONTACT LENS AND METHOD FOR PRODUCING THE SAME

(71) Applicant: NOF CORPORATION, Tokyo (JP)

(72) Inventors: Shu Takashima, Kawasaki (JP); Koh Kobayashi, Kawasaki (JP); Ryuya Gotanda, Kawasaki (JP); Norio Iwakiri, Kawasaki (JP); Yosuke Matsuoka, Kawasaki (JP); Eiji Harata, Kawasaki (JP)

(73) Assignee: NOF CORPORATION, Tokyo (JP)

( * ) Notice: Subject to any disclaimer, the term of this patent is extended or adjusted under 35 U.S.C. 154(b) by 631 days.

(21) Appl. No.: 17/605,415

(22) PCT Filed: Apr. 17, 2020

(86) PCT No.: PCT/JP2020/016975
§ 371 (c)(1),
(2) Date: Oct. 21, 2021

(87) PCT Pub. No.: WO2020/218220
PCT Pub. Date: Oct. 29, 2020

(65) Prior Publication Data
US 2022/0227911 A1    Jul. 21, 2022

(30) Foreign Application Priority Data
Apr. 25, 2019 (JP) .................. 2019-083615

(51) Int. Cl.
*C08F 290/06* (2006.01)
*C08G 77/395* (2006.01)
*G02B 1/04* (2006.01)
*G02C 7/04* (2006.01)

(52) U.S. Cl.
CPC ........ *C08F 290/068* (2013.01); *C08G 77/395* (2013.01); *G02B 1/043* (2013.01); *G02C 7/04* (2013.01)

(58) Field of Classification Search
CPC .. C08F 290/068; C08F 230/02; C08F 220/14; C08F 220/20; C08F 222/102; C08F 220/54

See application file for complete search history.

(56) References Cited

U.S. PATENT DOCUMENTS

| 2013/0120708 A1* | 5/2013 | Driver ................ G02B 1/043 |
| | | 351/159.02 |
| 2014/0135408 A1* | 5/2014 | Wang ................ C08G 77/392 |
| | | 556/439 |
| 2022/0169765 A1* | 6/2022 | Newman .......... B29D 11/00038 |

* cited by examiner

*Primary Examiner* — Robert T Butcher
(74) *Attorney, Agent, or Firm* — Sughrue Mion, PLLC

(57) ABSTRACT

Provided is a monomer composition for contact lenses, which uses a polysiloxane monomer to produce a polymer that shows satisfactory surface hydrophilicity and oxygen permeability, and that is excellent in modulus and elongation at break. It has been found that a monomer composition containing a phosphorylcholine group-containing polysiloxane monomer, a monovinyl ether monomer, and the like can achieve the above-mentioned object.

6 Claims, No Drawings

MONOMER COMPOSITION FOR CONTACT LENSES, POLYMER FOR CONTACT LENSES AND METHOD FOR PRODUCING SAME, AND CONTACT LENS AND METHOD FOR PRODUCING THE SAME

CROSS REFERENCE TO RELATED APPLICATIONS

This application is a National Stage of International Application No. PCT/JP2020/016975 filed Apr. 17, 2020, claiming priority based on Japanese Patent Application No. 2019-083615 filed Apr. 25, 2019.

TECHNICAL FIELD

The present invention relates to a monomer composition for contact lenses, a polymer of the composition and a method of producing the same, and a contact lens formed of a hydrate of the polymer and a method of producing the same.

The present application claims priority from Japanese Patent Application No. 2019-083615, which is incorporated herein by reference.

BACKGROUND ART

A silicone hydrogel contact lens puts little strain on the eyes by virtue of its high oxygen permeability. Meanwhile, a silicone hydrogel contains a hydrophobic silicone, and hence is liable to lack wettability or lubricity. Accordingly, investigations have been made on surface hydrophilization by a surface modification method and surface hydrophilization by mixing a hydrophilic polymer into a lens composition before curing thereof. At present, there exist various methods of providing a silicone hydrogel lens that has optical transparency and desired lubricity and has high oxygen permeability.

In Patent Literature 1, there is a disclosure of a silicone hydrogel produced by random copolymerization of MPC and SiGMA, which is a polysiloxane monomer having a hydroxy group.

In general, when MPC is used for copolymerization in the introduction of a phosphorylcholine group into a silicone hydrogel lens, there is a need to overcome phase separation between a highly hydrophilic MPC moiety and a hydrophobic silicone moiety in a silicone hydrogel backbone. Accordingly, there still remains room for improvement in stable production of silicone hydrogel lenses.

In Patent Literature 2, there is a disclosure of a polysiloxane monomer having phosphorylcholine-analogous groups introduced at both ends of a silicone chain. In addition, in each of Patent Literature 3 and Patent Literature 4, there is a disclosure of a polysiloxane monomer having phosphoryl groups introduced at both ends thereof. In each of the polysiloxane monomers having those structures, a polydimethylsiloxane moiety of a main chain is not modified, and hence it cannot necessarily be said that sufficient performance is obtained in terms of compatibility with a hydrophilic monomer and transparency of a lens to be obtained.

CITATION LIST

Patent Literature

[PTL 1] JP 2007-197513 A
[PTL 2] WO 2010/147779 A2
[PTL 3] WO 2001/057047 A1
[PTL 4] WO 2012/104349 A1

SUMMARY OF INVENTION

Technical Problem

Currently, the widely used silicone hydrogel contact lenses need to be replaced every certain period, and the replacement period is, for example, 1 day, or between 2 weeks and 1 month. A lens having a long replacement period is used by repeatedly wearing the same lens, and hence it is important for the lens not to change in shape when repeatedly used.

The shape stability of a contact lens is significantly affected by the modulus and elongation at break of the contact lens. However, a contact lens using a polysiloxane monomer has room for improvement in modulus and elongation at break, though being satisfactory in terms of surface hydrophilicity of the surface of the lens and oxygen permeability.

In view of the foregoing, an object of the present invention is to provide a monomer composition for contact lenses, which uses a polysiloxane monomer to produce a polymer that shows satisfactory surface hydrophilicity and oxygen permeability, and that is excellent in modulus and elongation at break.

Solution to Problem

The inventors of the present invention have made extensive investigations in order to achieve the above-mentioned object, and as a result, have found that a monomer composition containing a phosphorylcholine group-containing polysiloxane monomer, a monovinyl ether monomer, and the like can achieve the above-mentioned object. Thus, the present invention has been completed.

According to one embodiment of the present invention, there is provided a monomer composition for contact lenses, including the following components: (A) a phosphorylcholine group-containing polysiloxane monomer represented by the following formula (1); (B) a phosphorylcholine group-containing methacrylic monomer represented by the following formula (2); (C) a trimethylsiloxysilyl group-containing silicone monomer having at least one or more hydroxy groups in a molecule; (D) a monovinyl ether monomer having at least one or more hydroxy groups in a molecule; (E) one or more kinds of hydroxy group-containing monomers selected from: hydroxyethyl (meth)acrylate; hydroxypropyl (meth)acrylate; hydroxybutyl (meth)acrylate; and hydroxyethylacrylamide; and (F) a crosslinker, wherein, with respect to 100 mass % in total of all monomer components in the composition, a content ratio of the component (A) is from 10 mass % to 50 mass %, a content ratio of the component (B) is from 5 mass % to 20 mass %, a content ratio of the component (C) is from 5 mass % to 40 mass %, a content ratio of the component (D) is from 5 mass % to 40 mass %, a content ratio of the component (E) is from 5 mass % to 30 mass %, and a content ratio of the component (F) is from 0.1 mass % to 15 mass %.

According to one embodiment of the present invention, there is provided a monomer composition for contact lenses, including the following components: (A) a phosphorylcholine group-containing polysiloxane monomer represented by the following formula (1); (B) a phosphorylcholine group-containing methacrylic monomer represented by the following formula (2); (C) a trimethylsiloxysilyl group-containing silicone monomer having at least one or more hydroxy groups in a molecule; (D) a monovinyl ether monomer having at least one or more hydroxy groups in a molecule; (E) one or more kinds of hydroxy group-containing monomers selected from: hydroxyethyl (meth)acrylate; hydroxypropyl (meth)acrylate; hydroxybutyl (meth)acrylate; and hydroxyethylacrylamide; (F) a crosslinker; and (G) a monomer other than the components (A) to (F), wherein, with respect to 100 mass % in total of all monomer components in the composition, a content ratio of the component (A) is from 10 mass % to 50 mass %, a content ratio of the component (B) is from 5 mass % to 20 mass %, a content ratio of the component (C) is from 5 mass % to 40 mass %, a content ratio of the component (D) is from 5 mass % to 40 mass %, a content ratio of the component (E) is from 5 mass % to 30 mass %, a content ratio of the component (F) is from 0.1 mass % to 15 mass %, and a content ratio of the component (G) is from 0 mass % to 50 mass %.

In addition, a content ratio (mass ratio) among the components (A), (B), (C), (D), (E), (F), and (G) may be 100:from 10 to 200:from 10 to 400:from 10 to 400:from 10 to 300:from 1 to 150:from 0 to 500.

According to another embodiment of the present invention, there is provided a polymer for contact lenses, including a polymer of the monomer composition for contact lenses.

According to still another embodiment of the present invention, there are provided a contact lens, including a hydrate of the polymer for contact lenses, and a method of producing the same.

That is, the present invention is as described below.

1. A monomer composition for contact lenses, including the following components:
   (A) a phosphorylcholine group-containing polysiloxane monomer represented by the following formula (1);
   (B) a phosphorylcholine group-containing methacrylic monomer represented by the following formula (2);
   (C) a trimethylsiloxysilyl group-containing silicone monomer having at least one or more hydroxy groups in a molecule;
   (D) a monovinyl ether monomer having at least one or more hydroxy groups in a molecule;
   (E) one or more kinds of hydroxy group-containing monomers selected from: hydroxyethyl (meth)acrylate; hydroxypropyl (meth)acrylate; hydroxybutyl (meth)acrylate; and hydroxyethylacrylamide;

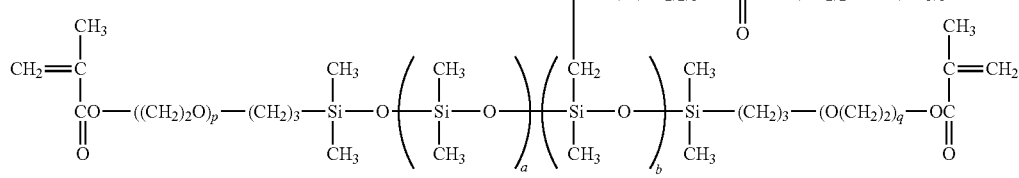

(1)

In the formula (1), "a" represents an integer of from 20 to 500, "b" represents an integer of from 1 to 70, "c" represents 0 or 1, "p" and "q" each represent 0 or 1, and X represents —CH$_2$— or —CH$_2$CH$_2$—.

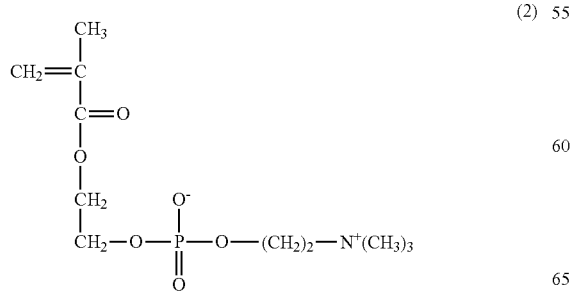

(2)

(F) a crosslinker; and
(G) a monomer other than the components (A) to (F),
wherein, with respect to 100 mass % in total of all monomer components in the composition, a content ratio of the component (A) is from 10 mass % to 50 mass %, a content ratio of the component (B) is from 5 mass % to 20 mass %, a content ratio of the component (C) is from 5 mass % to 40 mass %, a content ratio of the component (D) is from 5 mass % to 40 mass %, a content ratio of the component (E) is from 5 mass % to 30 mass %, a content ratio of the component (F) is from 0.1 mass % to 15 mass %, and a content ratio of the component (G) is from 0 mass % to 50 mass %:

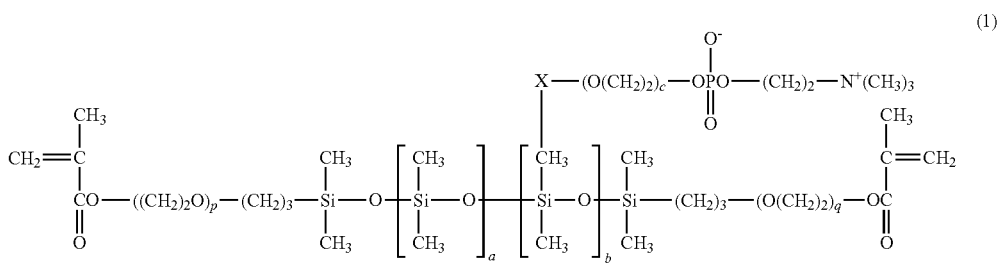

in the formula (1), "a" represents an integer of from 20 to 500, "b" represents an integer of from 1 to 70, "c" represents 0 or 1, "p" and "q" each represent 0 or 1, and X represents —$CH_2$— or —$CH_2CH_2$—.

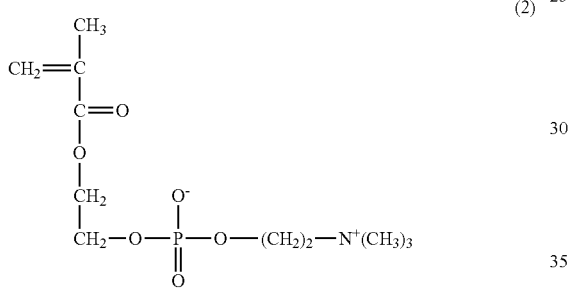

2. The monomer composition for contact lenses according to the above-mentioned item 1, further including a component (H) a solvent having a hydroxy group, wherein a content ratio of the component (H) is 30 parts by mass or less with respect to 100 parts by mass in total of all monomer components in the composition.

3. A polymer for contact lenses, including a polymer of the monomer composition for contact lenses of the above-mentioned item 1 or 2.

4. A contact lens, including a hydrate of the polymer for contact lenses of the above-mentioned item 3.

5. A method of producing a contact lens, including the steps of:
mixing the polymer for contact lenses of the above-mentioned item 3 with one or more kinds of solvents selected from: water; methanol; ethanol; 1-propanol; and 2-propanol to wash the polymer; and
immersing the polymer in saline to hydrate the polymer.

6. A method of producing a polymer for contact lenses, including a step of polymerizing the following monomer composition:
a composition including the following components:
(A) a phosphorylcholine group-containing polysiloxane monomer represented by the following formula (1);
(B) a phosphorylcholine group-containing methacrylic monomer represented by the following formula (2);
(C) a trimethylsiloxysilyl group-containing silicone monomer having at least one or more hydroxy groups in a molecule;
(D) a monovinyl ether monomer having at least one or more hydroxy groups in a molecule;
(E) one or more kinds of hydroxy group-containing monomers selected from: hydroxyethyl (meth)acrylate; hydroxypropyl (meth)acrylate; hydroxybutyl (meth)acrylate; and hydroxyethylacrylamide;
(F) a crosslinker; and
(G) a monomer other than the components (A) to (F),
wherein, with respect to 100 mass % in total of all monomer components in the composition, a content ratio of the component (A) is from 10 mass % to 50 mass %, a content ratio of the component (B) is from 5 mass % to 20 mass %, a content ratio of the component (C) is from 5 mass % to 40 mass %, a content ratio of the component (D) is from 5 mass % to 40 mass %, a content ratio of the component (E) is from 5 mass % to 30 mass %, a content ratio of the component (F) is from 0.1 mass % to 15 mass %, and a content ratio of the component (G) is from 0 mass % to 50 mass %:

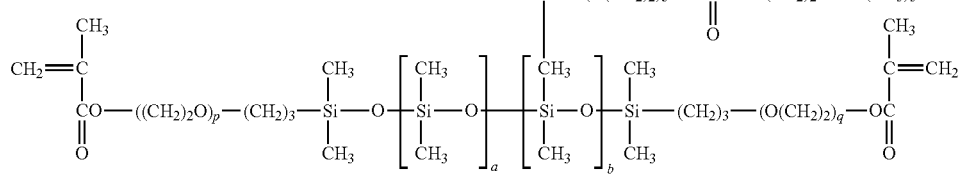

in the formula (1), "a" represents an integer of from 20 to 500, "b" represents an integer of from 1 to 70, "c" represents 0 or 1, "p" and "q" each represent 0 or 1, and X represents —CH$_2$— or —CH$_2$CH$_2$—.

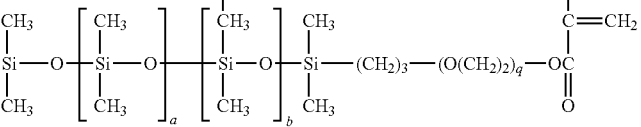

(1)

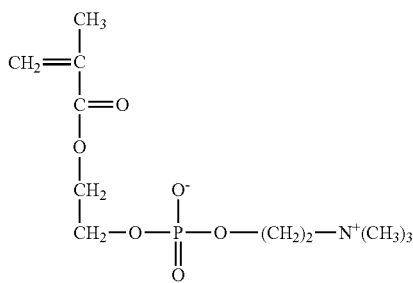

(2)

7. The method of producing a polymer for contact lenses according to the above-mentioned item 6, the composition further including a component (H) a solvent having a hydroxy group, wherein a content ratio of the component (H) is 30 parts by mass or less with respect to 100 parts by mass in total of all monomer components in the composition.

8. A use of the following monomer composition for producing a polymer for contact lenses:
a composition including the following components:
(A) a phosphorylcholine group-containing polysiloxane monomer represented by the following formula (1);
(B) a phosphorylcholine group-containing methacrylic monomer represented by the following formula (2);
(C) a trimethylsiloxysilyl group-containing silicone monomer having at least one or more hydroxy groups in a molecule;
(D) a monovinyl ether monomer having at least one or more hydroxy groups in a molecule;
(E) one or more kinds of hydroxy group-containing monomers selected from: hydroxyethyl (meth)acrylate; hydroxypropyl (meth)acrylate; hydroxybutyl (meth)acrylate; and hydroxyethylacrylamide;
(F) a crosslinker; and
(G) a monomer other than the components (A) to (F),
wherein, with respect to 100 mass % in total of all monomer components in the composition, a content ratio of the component (A) is from 10 mass % to 50 mass %, a content ratio of the component (B) is from 5 mass % to 20 mass %, a content ratio of the component (C) is from 5 mass % to 40 mass %, a content ratio of the component (D) is from 5 mass % to 40 mass %, a content ratio of the component (E) is from 5 mass % to 30 mass %, a content ratio of the component (F) is from 0.1 mass % to 15 mass %, and a content ratio of the component (G) is from 0 mass % to 50 mass %:

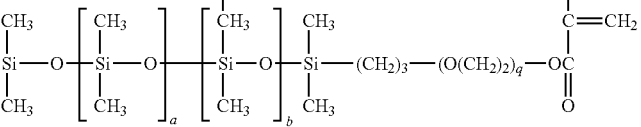

(1)

in the formula (1), "a" represents an integer of from 20 to 500, "b" represents an integer of from 1 to 70, "c" represents 0 or 1, "p" and "q" each represent 0 or 1, and X represents —CH$_2$— or —CH$_2$CH$_2$—.

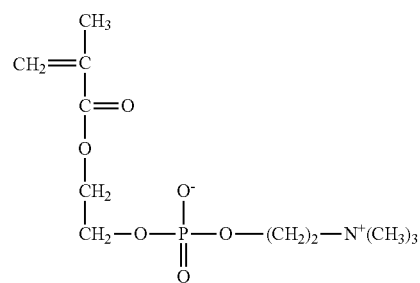

(2)

9. The use of the monomer composition for producing a polymer for contact lenses according to the above-mentioned item 8, the composition further including a component (H) a solvent having a hydroxy group, wherein a content ratio of the component (H) is 30 parts by mass or less with respect to 100 parts by mass in total of all monomer components in the composition.

10. A use of the following monomer composition for a polymer for contact lenses:
a composition including the following components:
(A) a phosphorylcholine group-containing polysiloxane monomer represented by the following formula (1);
(B) a phosphorylcholine group-containing methacrylic monomer represented by the following formula (2);
(C) a trimethylsiloxysilyl group-containing silicone monomer having at least one or more hydroxy groups in a molecule;
(D) a monovinyl ether monomer having at least one or more hydroxy groups in a molecule;
(E) one or more kinds of hydroxy group-containing monomers selected from: hydroxyethyl (meth)acrylate; hydroxypropyl (meth)acrylate; hydroxybutyl (meth)acrylate; and hydroxyethylacrylamide;
(F) a crosslinker; and
(G) a monomer other than the components (A) to (F),
wherein, with respect to 100 mass % in total of all monomer components in the composition, a content ratio of the component (A) is from 10 mass % to 50 mass %, a content ratio of the component (B) is from 5 mass % to 20 mass %, a content ratio of the component (C) is from 5 mass % to 40 mass %, a content ratio of the component (D) is from 5 mass % to 40 mass %, a content ratio of the component (E) is from 5 mass % to 30 mass %, a content ratio of the component (F) is from 0.1 mass % to 15 mass %, and a content ratio of the component (G) is from 0 mass % to 50 mass %:

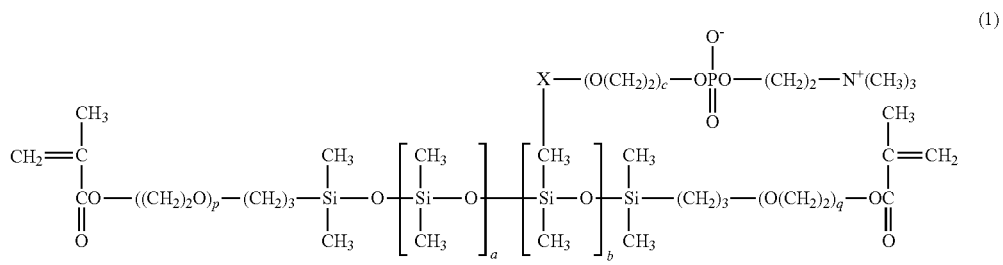

in the formula (1), "a" represents an integer of from 20 to 500, "b" represents an integer of from 1 to 70, "c" represents 0 or 1, "p" and "q" each represent 0 or 1, and X represents —CH$_2$— or —CH$_2$CH$_2$—.

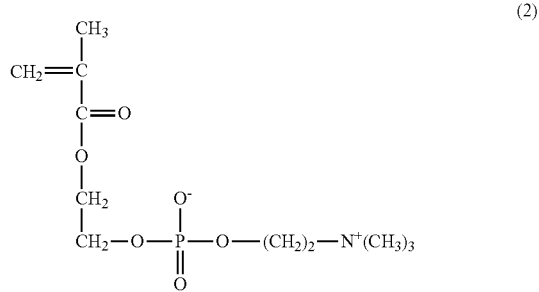

11. The use of the monomer composition for a polymer for contact lenses according to the above-mentioned item 10, the composition further including a component (H) a solvent having a hydroxy group, wherein a content ratio of the component (H) is 30 parts by mass or less with respect to 100 parts by mass in total of all monomer components in the composition.

Advantageous Effects of Invention

The contact lens of the present invention is produced using the monomer composition for contact lenses of the present invention, and hence can be simultaneously excellent in surface hydrophilicity, modulus, elongation at break, and oxygen permeability (Dk).

DESCRIPTION OF EMBODIMENTS

A monomer composition for contact lenses of the present invention contains components (A) to (F), which are described later, as essential monomer components, may further contain a component (G) as an optional monomer component, and may further contain a component (H) as an optional solvent component.

A polymer for contact lenses of the present invention is obtained from the monomer composition for contact lenses of the present invention. In addition, a contact lens of the present invention is obtained from the polymer for contact lenses of the present invention. Moreover, the contact lens of the present invention may be a hydrate of the polymer for contact lenses of the present invention. The monomer composition for contact lenses of the present invention is hereinafter referred to simply as "composition". In addition, the polymer for contact lenses of the present invention is referred to simply as "polymer".

In the present invention, "excellent in elongation at break" is not particularly limited in terms of numerical value, but preferably means a case of having an elongation at break of 250% or more in mechanical strength measurement described in detail in Examples. In addition, "excellent in hydrophilicity" is not particularly limited in terms of numerical value, but preferably means a case of 30 seconds or more in water film break up time (WBUT) evaluation described in detail in Examples. In addition, "excellent in oxygen permeability" is not particularly limited in terms of numerical value, but preferably means a case of having an oxygen permeability (Dk) of 75 or more in oxygen permeability measurement described in detail in Examples.

The component (A) is a phosphorylcholine group-containing polysiloxane monomer represented by the following formula (1). The component (A) is a component that contributes to improving the oxygen permeability and surface hydrophilicity of a contact lens to be produced. The number-average molecular weight of the phosphorylcholine group-containing polysiloxane monomer in the present invention only needs to be from 2,000 to 50,000, and is preferably from 4,600 to 42,000.

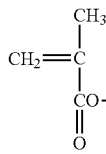
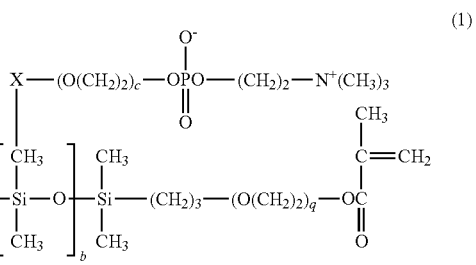

(1)

In the formula, "a" represents an integer of from 20 to 500, "b" represents an integer of from 1 to 70, "c" represents 0 or 1, "p" and "q" each represent 0 or 1, and X represents —CH$_2$— or —CH$_2$CH$_2$—.

"a" and "b" are not particularly limited as long as "a" and "b" fall within the above-mentioned ranges. However, "a" represents from 20 to 500, preferably from 50 to 300, more preferably from 80 to 200, and "b" represents from 1 to 70, preferably from 2 to 40, more preferably from 3 to 15.

In the composition of the present invention, the content ratio of the component (A) is from 10 mass % to 50 mass %, preferably from 15 mass % to 50 mass %, more preferably from 25 mass % to 40 mass % with respect to 100 mass % in total of all monomer components. When the content ratio of the component (A) is less than 10 mass %, there is a concern that the oxygen permeability of the contact lens to be produced may become insufficient. Meanwhile, when the content ratio is more than 50 mass %, the contact lens is clouded in some cases.

In the present invention, the "monomer component" means a component having one or more polymerizable unsaturated groups in the molecule. That is, the "monomer component" encompasses the components (A) to (F) and (G), and does not encompass the component (H).

The component (B) is a phosphorylcholine group-containing methacrylic monomer represented by the following formula (2), and is specifically 2-methacryloyloxyethyl phosphorylcholine (MPC). The component (B) is a component that contributes to improving the surface hydrophilicity and lubricity of the contact lens to be produced.

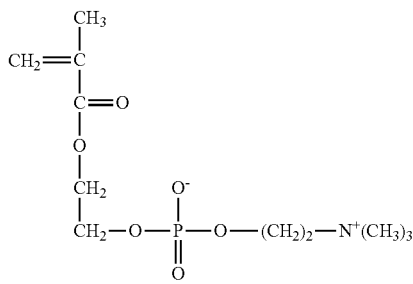

(2)

In the composition of the present invention, the content ratio of the component (B) is from 5 mass % to 20 mass %, preferably from 8 mass % to 15 mass % with respect to 100 mass % in total of all monomer components. When the content ratio of the component (B) is less than 5 mass %, sufficient surface hydrophilicity is not obtained. Meanwhile, when the content ratio is more than 20 mass %, it becomes difficult to dissolve the component (B) in the composition, and there is a concern of an increase in modulus (tensile stress) of the contact lens.

The component (C) is a trimethylsiloxysilyl group-containing silicone monomer having at least one or more hydroxy groups in the molecule. The component (C) is a component that contributes to improving the oxygen permeability and transparency of the contact lens to be produced.

Specific examples of the component (C) include 4-(2-hydroxyethyl)=1-[3-tris(trimethylsiloxy)silylpropyl]=2-methylidene succinate, 2-hydroxy-3-[tris(trimethylsiloxy)silyl]propyl methacrylate, and 2-hydroxy-3-[bis(trimethylsiloxy)methylsilyl]propyl methacrylate. Of those, 4-(2-hydroxyethyl)=1-[3-tris(trimethylsiloxy)silylpropyl]=2-methylidene succinate and 2-hydroxy-3-[bis(trimethylsiloxy)methylsilyl]propyl methacrylate are preferred, and 4-(2-hydroxyethyl)=1-[3-tris(trimethylsiloxy)silylpropyl]=2-methylidene succinate is more preferred.

In the composition of the present invention, the content ratio of the component (C) is from 5 mass % to 40 mass %, preferably from 10 mass % to 20 mass % with respect to 100 mass % in total of all monomer components. When the content ratio of the component (C) is less than 5 mass %, there are a risk in that the dissolution of the component (B) may become difficult, and a risk in that a polymer for contact lenses to be produced may be clouded. Meanwhile, when the content ratio is more than 40 mass %, there is a concern that the surface hydrophilicity of the contact lens may become insufficient.

The component (D) is a monovinyl ether monomer having at least one or more hydroxy groups in the molecule. The component (D) is a component that contributes to improving the surface hydrophilicity and elongation at break of the contact lens to be produced.

Specific examples of the component (D) include ethylene glycol monovinyl ether, diethylene glycol monovinyl ether, and tetramethylene glycol monovinyl ether. Of those, ethylene glycol monovinyl ether and diethylene glycol monovinyl ether are preferred, and ethylene glycol monovinyl ether is more preferred.

In the composition of the present invention, the content ratio of the component (D) is from 5 mass % to 40 mass %, preferably from 10 mass % to 20 mass % with respect to 100 mass % in total of all monomer components. When the content ratio of the component (D) is less than 5 mass %, there is a concern that the elongation at break may become insufficient. There is a risk that the polymer for contact lenses to be produced may be clouded. Meanwhile, when the content ratio is more than 40 mass %, polymerizability is degraded, and hence there is a concern that the effects of the present invention may not be sufficiently obtained.

The component (E) is one or more kinds of hydroxy group-containing monomers selected from: hydroxyethyl (meth)acrylate; hydroxypropyl (meth)acrylate; hydroxybutyl (meth)acrylate; and hydroxyethylacrylamide. Of those, hydroxyethyl methacrylate, hydroxypropyl methacrylate, and/or hydroxybutyl methacrylate is preferred, and hydroxypropyl methacrylate and/or hydroxybutyl methacrylate is more preferred. When the component (E) is contained in a predetermined amount, the dissolution of the component (B) in the composition of the present invention becomes satisfactory. From the viewpoint of such solubility of the component (B), the hydroxy group of the component (E) is preferably a primary hydroxy group.

In the present invention, "(meth)acrylate" means "acrylate and/or methacrylate", and "(meth)acrylic" means "acrylic and/or methacrylic".

In the composition of the present invention, the content ratio of the component (E) is from 5 mass % to 30 mass %, preferably from 5 mass % to 15 mass % with respect to 100 mass % in total of all monomer components. When the content ratio of the component (E) is less than 5 mass %, the composition of the present invention does not become a uniform and transparent liquid, and hence there is a concern that the effects of the present invention may not be sufficiently obtained. Meanwhile, when the content ratio is more than 30 mass %, there is a concern that the oxygen permeability of the contact lens may be reduced.

The component (F) serves as a crosslinker at the time of the polymerization reaction of the monomers that are the components (A) to (E). The component (F) generally has two or more polymerizable unsaturated groups. By virtue of the composition of the present invention containing a predetermined amount of the component (F), the polymer of the present invention has a crosslinked structure, and hence the contact lens of the present invention shows an excellent modulus.

Specific examples the component (F) include a silicone dimethacrylate represented by the following formula (3), ethylene glycol divinyl ether, diethylene glycol divinyl ether, triethylene glycol divinyl ether, methylenebisacrylamide, an alkylene glycol di(meth)acrylate (number of carbon atoms of alkylene: 2 to 6), a polyalkylene glycol di(meth)acrylate (number of carbon atoms of alkylene: 2 to 4), divinylsulfone, divinylbenzene, trivinylbenzene, trimethylolpropane tri(meth)acrylate, pentaerythritol tetra(meth)acrylate, pentaerythritol tri(meth)acrylate, allyl methacrylate, (2-allyloxy)ethyl methacrylate, 2-(2-vinyloxyethoxy)ethyl acrylate, and 2-(2-vinyloxyethoxy)ethyl methacrylate. Of those, a silicone dimethacrylate represented by the formula (3), triethylene glycol divinyl ether, and tetraethylene glycol di(meth)acrylate are preferred, and triethylene glycol divinyl ether and tetraethylene glycol di(meth)acrylate are more preferred. The component (F) may be any one kind of those crosslinkers, or may be a mixture of two or more kinds thereof, but is preferably a mixture of two or more kinds, more preferably a mixture of triethylene glycol divinyl ether and tetraethylene glycol di(meth)acrylate at a mass ratio of from 1/4 to 4/1 (1:4 to 4:1), particularly preferably a mixture thereof at from 1/2 to 2/1 (1:2 to 2:1).

In the formula (3), "p" and "r" are equal to each other, and represent 0 or 1. "q" represents the number of repetitions of a dimethylsiloxane moiety, and represents from 10 to 70. The silicone dimethacrylate represented by the formula (3) may be a mixture of a plurality of compounds having different numbers of repetitions "q". In this case, "q" represents an average value at a number-average molecular weight, and falls within the range of from 10 to 70 from the viewpoint of availability.

In the composition of the present invention, the content ratio of the component (F) is from 0.1 mass % to 15 mass %, preferably from 0.5 mass % to 5 mass %, more preferably from 1 mass % to 3 mass % with respect to 100 mass % in total of all monomer components. When the content ratio of the component (F) is less than 0.1 mass %, the solvent resistance of the polymer is reduced, and hence the polymer may break at the time of its washing. When the content ratio is more than 15 mass %, there is a concern that the contact lens is so brittle as to break, and the modulus becomes so high as to degrade wearing sensation in some cases.

The component (G) is a monomer other than the components (A) to (F). The component (G) is an optional component, and may be blended for the purpose of, for example, adjusting the water content in the contact lens.

Specific examples of the component (G) include methyl (meth)acrylate, (meth)acrylic acid, 2-methacryloyloxyethyl succinate, alkyl methacrylates, such as methyl (meth)acrylate, ethyl (meth)acrylate, and butyl (meth)acrylate, methoxypolyethylene glycol methacrylate, N-vinylpyrrolidone, and amide group-containing monomers, such as N,N-dimethylacrylamide, N-vinyl-N-methylacetamide, and N-methylacetamide.

The component (G) may be any one kind of those monomers, or may be a mixture of two or more kinds thereof.

When the component (G) is contained, its content is 50 mass % or less with respect to the total amount of all monomer components in the composition of the present invention, and may be from 0 mass % to 50 mass %, from 0.01 mass % to 50 mass %, from 0.1 mass % to 50 mass %, from 1 mass % to 50 mass %, or from 10 mass % to 50 mass %. When the content is 50 mass % or less, the solubility of the component (A) in the composition of the present invention is satisfactory, and the effects of the present invention can be obtained in a well-balanced manner.

The component (H) is a solvent having a hydroxy group, and may be a carboxylic acid or an alcohol. The component (H) may be blended for the purpose of stabilizing the modulus and shape of the contact lens. Specific examples of the component (H) include methanol, ethanol, 1-propanol, 2-propanol, 1-butanol, 2-butanol, tert-butanol, 1-pentanol, 2-pentanol, tert-amyl alcohol, 1-hexanol, 1-octanol, 1-decanol, 1-dodecanol, glycolic acid, lactic acid, and acetic acid. The component (H) may be any one kind of those solvents, or may be a mixture of two or more kinds thereof. From the

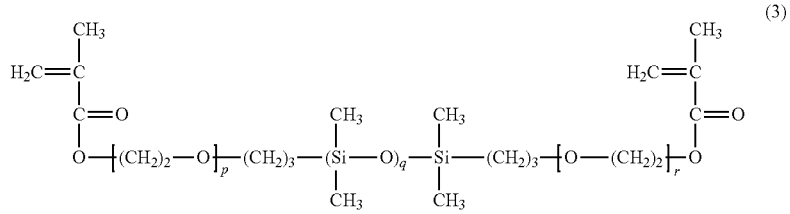

(3)

viewpoints of availability and pH stability, the component (H) is preferably formed of one or more kinds selected from: ethanol; 1-propanol; 2-propanol; and 1-hexanol.

When the composition of the present invention contains the component (H), the content ratio of the component (H) is 30 parts by mass or less, preferably 20 parts by mass or less with respect to 100 parts by mass in total of all monomer components in the composition. When the content ratio is 30 parts by mass or less, the modulus and shape of the contact lens can be retained in a well-balanced manner.

The composition of the present invention may contain a polymerization initiator in addition to the components (A) to (H). The polymerization initiator may be a known one, and is preferably a thermal polymerization initiator. The use of the thermal polymerization initiator facilitates a change in copolymerizability of the monomer components based on a change in temperature during polymerization. Examples of the thermal polymerization initiator include: azo-based polymerization initiators, such as 2,2'-azobisisobutyronitrile, dimethyl 2,2-azobis(2-methylpropionate), 2,2'-azobis[2-(2-imidazolin-2-yl)propane]dihydrochloride, 2,2'-azobis(2,4-dimethylvaleronitrile), 2,2'-azobis[2-(2-imidazolin-2-yl)propane]disulfate dihydrate, 2,2'-azobis(2-methylpropionamidine) dihydrochloride, 2,2'-azobis[N-(2-carboxyethyl)-2-methylpropionamidine]dihydrate, 2,2'-azobis[2-(2-imidazolin-2-yl)propane], 2,2'-azobis(1-imino-1-pyrrolidino-2-methylpropane)dihydrochloride, 2,2'-azobis[2-methyl-N-{1,1-bis(hydroxymethyl)-2-hydroxyethyl}propionamide], 2,2'-azobis[2-methyl-N-(2-hydroxyethyl)propionamide], 2,2'-azobis(2-methylpropionamidine)dihydrochloride, and 2,2'-azobis[2-methyl-N-(2-hydroxyethyl)propionamide]; and peroxide-based polymerization initiators, such as benzoyl peroxide, t-butyl hydroperoxide, cumene hydroperoxide, lauroyl peroxide, t-butyl peroxyhexanoate, and 3,5,5-trimethylhexanoyl peroxide. Those polymerization initiators may be used alone or in combination thereof. Of those, azo-based polymerization initiators are preferred from the viewpoints of safety and availability, and 2,2'-azobisisobutyronitrile, dimethyl 2,2-azobis(2-methylpropionate), and 2,2'-azobis(2,4-dimethylvaleronitrile) are particularly preferred from the viewpoint of reactivity.

The amount of the polymerization initiator to be added is from 0.1 part by mass to 3 parts by mass, preferably from 0.1 part by mass to 2 parts by mass, more preferably from 0.2 part by mass to 1 part by mass with respect to 100 parts by mass in total of all monomer components in the composition. When the amount falls within the range of from 0.1 part by mass to 3 parts by mass, a polymerization product of the monomer composition of the present invention can be easily obtained.

The composition of the present invention may contain an additive, such as a polymerizable ultraviolet absorber or a polymerizable dyestuff (colorant), in addition to the components (A) to (H) and the polymerization initiator to the extent that the purpose of the present invention is not impaired. When the ultraviolet absorber is blended, strain on the eyes due to ultraviolet light, such as sunlight, can be reduced. In addition, when the dyestuff is blended, a colored contact lens can be obtained.

The use amounts of those additives depend on, for example, the thickness of the contact lens, but in general, the content ratio of each of the polymerizable ultraviolet absorber and the polymerizable dyestuff is preferably 5 parts by mass or less, more preferably from 0.02 part by mass to 3 parts by mass with respect to 100 parts by mass in total of all monomer components.

A method of producing the composition of the present invention is not particularly limited, and the composition may be produced by, for example, loading the components into a stirring (mixing) apparatus in any order or in one batch, and stirring (mixing) the components to uniformity at a temperature of from 10° C. to 50° C. However, when the composition contains the polymerization initiator, attention is required to prevent the initiation of a polymerization reaction during the mixing, and the mixing is preferably performed at 40° C. or less. From the viewpoint that the solubility of the component (A) becomes satisfactory, it is preferred that, after three components, i.e., the components (A), (B), and (C) have been mixed and dissolved, the other components be added thereto and mixed therewith.

The polymer of the present invention is formed of a polymer of the composition of the present invention described above. A method of producing the polymer of the present invention is described below. The production method described below is merely a method of obtaining the polymer according to one embodiment, and the polymer of the present invention is not limited to the one obtained by this production method.

The polymer of the present invention may be produced by filling a mold with the composition of the present invention, followed by a polymerization reaction. As the mold, there may be used a mold having a hydrophobic surface formed of polypropylene or the like.

The polymerization reaction may be performed by one polymerization step or two or more polymerization steps. The polymerization reaction may be performed by, for example, one polymerization step of keeping the composition for 1 hour or more at a temperature of from 45° C. to 140° C. in accordance with the decomposition temperature of the polymerization initiator to be used, but is preferably performed by one polymerization step formed of a polymerization step 2 described below, or two or more polymerization steps including a polymerization step 1 and the polymerization step 2. The completion of polymerization may be followed by, for example, cooling to 60° C. or less and removal of the polymer from the mold.

(Polymerization Step 1)

The polymerization step 1 is a step of performing polymerization at a temperature of from 45° C. to 140° C. for 1 hour or more, in which the above-mentioned polymerization initiator is added to the composition as required.

The polymerization temperature in the polymerization step 1 is preferably from 50° C. to 70° C., more preferably from 55° C. to 70° C. When the polymerization temperature in the polymerization step 1 is from 45° C. to 75° C., a polymer satisfactory in terms of physical properties such as surface hydrophilicity can be stably obtained.

The polymerization time in the polymerization step 1 is preferably 2 hours or more and 12 hours or less. When the polymerization time in the polymerization step 1 is from 1 hour to 12 hours, a polymer satisfactory in terms of physical properties such as surface hydrophilicity can be efficiently obtained.

(Polymerization Step 2)

The polymerization step 2 is a step of performing a polymerization reaction at from 90° C. to 140° C. When the polymerization step 1 is not performed, the polymerization step 2 is performed with the above-mentioned polymerization initiator being added to the composition as required.

The polymerization temperature in the polymerization step 2 is preferably from 100° C. to 120° C. When the polymerization temperature in the polymerization step 2 is from 90° C. to 140° C., a polymer satisfactory in terms of physical properties such as surface hydrophilicity can be stably obtained, and the polymer can be efficiently obtained without deforming the mold formed of polypropylene or the like.

The polymerization time in the polymerization step 2 is preferably 1 hour or more and 10 hours or less. When the polymerization time in the polymerization step 2 is from 1 hour to 10 hours, a polymer satisfactory in terms of physical properties such as surface hydrophilicity can be efficiently obtained.

Atmospheres in which the polymerization steps 1 and 2 are performed are not particularly limited, but it is preferred from the viewpoint of improving a polymerization ratio that each of the polymerization steps 1 and 2 be performed in an atmosphere of an inert gas, such as nitrogen or argon. In this case, the inert gas may be caused to flow through the composition, or the inert gas atmosphere may be established in a composition filling site of the mold.

A pressure in the mold may be from atmospheric pressure to slightly increased pressure. When the polymerization is performed in the inert gas atmosphere, the pressure is preferably set to 1 kgf/cm² or less in terms of gauge pressure.

The contact lens of the present invention may be a silicone hydrogel contact lens formed of a hydrate of the above-mentioned polymer. That is, the contact lens of the present invention is obtained by forming a hydrogel through hydration of the polymer of the present invention and impregnation thereof with water. As used herein, the term "silicone hydrogel" refers to a hydrogel having a silicone moiety in its polymer. The composition of the present invention contains the components (A) and (C), which are silicone-containing monomers, and hence the polymer thereof has a silicone moiety and can form a silicone hydrogel when hydrated (impregnated with water).

The water content of the contact lens (ratio of water to the total mass of the contact lens) is 35 mass % or more and 60 mass % or less, preferably 35 mass % or more and 50 mass % or less. When the water content is from 35 mass % to 60 mass %, the contact lens can be made excellent in balance between the water content and the oxygen permeability.

Next, a method of producing the contact lens of the present invention is described. The production method described below is merely a method of obtaining the contact lens according to one embodiment of the present invention, and the contact lens of the present invention is not limited to the one obtained by this production method.

After the polymerization reaction, the polymer is sometimes in the state of a mixture with an unreacted monomer component (unreacted substance), a residue of each component, a by-product, a residual solvent, or the like. Although such mixture may be subjected to hydration treatment as it is, it is preferred that the polymer be purified using a solvent for purification before the hydration treatment.

Examples of the solvent for purification include water, methanol, ethanol, 1-propanol, 2-propanol, and a mixture thereof. The purification may be performed, for example, as follows: at a temperature of from 10° C. to 40° C., the polymer is immersed in an alcohol solvent for from 10 minutes to 5 hours, and then immersed in water for from 10 minutes to 5 hours. In addition, after being immersed in the alcohol solvent, the polymer may be immersed in a hydrous alcohol having an alcohol concentration of from 20 wt % to 50 wt % for from 10 minutes to 5 hours, and further immersed in water. The water is preferably pure water, ion-exchanged water, or the like.

When the polymer is immersed in saline to be hydrated so as to have a predetermined water content, the contact lens of the present invention is obtained. The saline may be borate buffered saline, phosphate buffered saline, or the like. In addition, the polymer may be immersed in a saline-containing preserving solution for soft contact lenses. The osmotic pressure of the saline is preferably from 250 mOms/kg to 400 moms/kg from the viewpoint of hydration.

The contact lens of the present invention has high surface hydrophilicity and high oxygen permeability, and besides, has appropriate mechanical strength and excellent wearing sensation, and hence can be used for about 1 month in a general mode of use. That is, the replacement frequency of the contact lens of the present invention may be up to 1 month. Of course, the contact lens may be replaced in a shorter period.

EXAMPLES

The present invention is described in more detail by way of Examples and Comparative Examples, but the present invention is not limited thereto. First, components used in Examples and Comparative Examples are described below.

Component (A)

Compound represented by Formula (1) synthesized by Following Method
(A-1)

In a 1 L four-necked flask, 97.26 g (0.68 mol) of 2-chloro-2-oxo-1,3,2-dioxaphospholane (COP) was dissolved in 389.03 g of acetonitrile, and the whole was cooled to 5° C. or less in an ice bath. A solution obtained by dissolving 66.38 g (0.65 mol) of ethylene glycol monoallyl ether (manufactured by Tokyo Chemical Industry Co., Ltd.) and 69.07 g (0.68 mol) of triethylamine (manufactured by Kishida Chemical Co., Ltd.) in 135.45 g of acetonitrile in a 500 mL beaker was transferred to a 300 mL dropping funnel, and added dropwise into the previously prepared COP solution over 1 hour. Further, a reaction was performed in an ice bath for 4 hours. Triethylamine hydrochloride produced by the reaction was separated by filtration, and then 61.46 g (1.04 mol) of trimethylamine was loaded. The mixture was subjected to a reaction at 75° C. for 8 hours. After cooling, the produced target product was separated by filtration, and washed with 140 g of acetone twice. The solvent was removed under reduced pressure to give 104.1 g of an allyl group-containing phosphorylcholine compound.

In a 500 mL light-shielding bottle, 17.24 g of FM-7711 (JNC Corporation, dual-end methacryloyloxypropylpolydimethylsiloxane (molecular weight≈1,000)), 150.0 g of octamethylcyclotetrasiloxane, 6.74 g of 1,3,5,7-tetramethylcyclotetrasiloxane, and 173.99 g of chloroform were mixed, and 1.50 g of trifluoromethanesulfonic acid was further added. The mixture was subjected to a reaction at 25° C. for 8 hours, and then washed with about 1,500 g of ion-exchanged water 5 times. After that, low-boiling components were removed under reduced pressure, 24.2 g of acetone and 120.1 g of methanol were added, and the whole was stirred. After the mixture had been left to stand still, an upper layer was discarded, and a lower layer was placed under reduced pressure to evaporate low-boiling components to give 127.09 g of a hydrosilyl group-containing dual-end methacrylic silicone that was a transparent liquid.

In a 100 mL three-necked flask, 10.00 g of the hydrosilyl group-containing dual-end methacrylic silicone and 0.2140 g of the allyl group-containing phosphorylcholine compound were dissolved in 10.00 g of 2-propanol, and the solution was heated to 80° C. using an oil bath, followed by the addition of 40 μL of a 4 wt % solution of hexachloroplatinic acid hexahydrate in 2-propanol.

A solution obtained by dissolving 1.93 g of the allyl group-containing phosphorylcholine compound represented by the formula (5) in 5.78 g of 2-propanol was loaded into a 10 mL dropping funnel, which was attached to an upper part of the three-necked flask.

The solution in the dropping funnel was added dropwise over 30 minutes while the mixture was kept at 80° C. After the dropwise addition, the mixture was subjected to a reaction for an additional 1 hour under reflux. Low-boiling components were evaporated under reduced pressure. After that, the residue was mixed with 33.18 g of ion-exchanged water, 11.05 g of ethanol, and 44.21 g of ethyl acetate, and the whole was stirred. After having been left to stand still, the mixture was separated into three layers. The upper layer and the lower layer were discarded, and then reduced-pressure evaporation from the middle layer under reduced pressure gave 7.31 g of a transparent gel-like product. It was recognized by $^1$H NMR analysis that the product was the compound represented by the formula (1).

For the component (A-1) used herein, the molar ratio of constituent units in the formula (1) and the number-average molecular weight are shown in Table 1.

$^1$H NMR Analysis Values

Peak area values for 2H of end double bonds at 5.54 ppm and 6.10 ppm (1.00+1.00=2.00)

An area value for 9H derived from a choline group at 3.34 ppm (46.89)

A peak area value derived from siloxane at 0.16 ppm (646.15)

Calculation from the above-mentioned values found the following: a≈108, b=5, c=1, p=q=0, and X represents —CH$_2$CH$_2$— in the structural formula of the formula (1).

In addition, the number-average molecular weight was measured using a gel permeation chromatography (GPC) method and calculated using polymethyl methacrylate (PMMA) as a standard under the following measurement conditions, and the result of the calculation was as follows: number-average molecular weight Mn≈10,000.

Eluent: tetrahydrofuran
Flow rate: 0.8 mL/min
Column: three PLgel mixed-E columns (connected in series)
Column temperature: 40° C.
Detector: differential refractometer
(A-2 to A-6)

A-2 to A-6 were obtained in the same manner as A-1 except that: the molecular weight and hydrosilyl group content ratio of the hydrosilyl group-containing dual-end methacrylic silicone were changed; and the loading amount of the allyl group-containing phosphorylcholine compound was changed in proportion to the concentration of hydrosilyl groups. A-5 and A-6 are each an (A)-like component in which "a" in the formula (1) fails to be from 20 to 500. The molar ratios of the constituent units in the formula (1) of A-2 to A-6 and the calculation results of the number-average molecular weights thereof are shown in Table 1.

TABLE 1

|  | A-1 | A-2 | A-3 | A-4 | A-5 | A-6 |
|---|---|---|---|---|---|---|
| Formula (1) "a" | 108 | 20 | 500 | 52 | 600 | 10 |
| Formula (1) "b" | 5 | 1 | 70 | 7 | 1 | 1 |
| Formula (1) "c" | 1 | 1 | 1 | 1 | 1 | 1 |
| Formula (1) "p" | 0 | 0 | 0 | 0 | 0 | 0 |
| Formula (1) "q" | 0 | 0 | 0 | 0 | 0 | 0 |
| Formula (1) X | —CH$_2$CH$_2$— | —CH$_2$CH$_2$— | —CH$_2$CH$_2$— | —CH$_2$CH$_2$— | —CH$_2$CH$_2$— | —CH$_2$CH$_2$— |
| Number-average molecular weight | 10,000 | 2,000 | 42,000 | 4,600 | 45,000 | 1,200 |

Component (B)

MPC: compound represented by the formula (2)

Component (C)

ES: 4-(2-hydroxyethyl)=1-[3-tris(trimethylsiloxy)silylpropyl]=2-methylidene succinate
SiGMA: 2-hydroxy-3-[bis(trimethylsiloxy)methylsilyl] propyl methacrylate Component (D)

EGMV: ethylene glycol monovinyl ether
DEGMV: diethylene glycol monovinyl ether

Component (E)

HEMA: 2-hydroxyethyl methacrylate
HPMA: 2-hydroxypropyl methacrylate
HBMA: 2-hydroxybutyl methacrylate Component (F)

FM-7711: compound represented by the formula (3) (p=r=0, q=10, number-average molecular weight Mn≈1,000)
TEGDV: triethylene glycol divinyl ether
TEGDMA: tetraethylene glycol dimethacrylate Component (G)

MMA: methyl methacrylate
NVP: N-vinylpyrrolidone
DMAA: N,N-dimethylacrylamide

Component (H)

HeOH: 1-hexanol

Polymerization Initiator

AIBN: 2,2'-azobis(isobutyronitrile)

Compositions, polymers, and contact lenses of Examples and Comparative Examples were evaluated for the following items.

Modulus (Tensile Stress) of Contact Lens

The modulus [MPa] of a contact lens was measured in accordance with JIS-K7127 through use of a BAS-3305(W) breaking strength analyzer manufactured by Yamaden Co., Ltd. Specifically, a sample having a width of 2 mm was used and measured for its modulus by being pulled at a speed of 1 mm/second with a distance between clamps being set to 6 mm through use of a 200 gf load cell. When the modulus was 0.3 MPa or more and less than 0.7 MPa, it was judged that the modulus (tensile stress) was satisfactory.

Elongation at Break of Contact Lens

The elongation at break [%] of a contact lens was measured in accordance with JIS-K7127 through use of a BAS-3305(W) breaking strength analyzer manufactured by Yamaden Co., Ltd. Specifically, a sample having a width of 2 mm was used and measured for its elongation at break by being pulled at a speed of 1 mm/second with a distance between clamps being set to 6 mm through use of a 200 gf load cell. When the elongation at break was 250% or more, it was judged that the elongation at break was satisfactory.

Surface Hydrophilicity (WBUT) of Contact Lens

The surface hydrophilicity of a contact lens was evaluated on the basis of a water film break up time (WBUT). Specifically, a sample was immersed in ISO saline overnight, and was lifted off the water surface by holding its periphery with tweezers, and a period of time between the lifting from the water surface and the break-up of a water film on the lens surface (water film retention time) was measured. A state in which the water film was broken up was judged by visual observation. The measurement was performed 3 times, and the average value thereof was determined. When the average value was 30 seconds or more, it was judged that the surface hydrophilicity was satisfactory.

Water Content of Contact Lens

A water content was measured by a method described in ISO-18369-4.

Oxygen Permeability of Contact Lens

The oxygen permeability (Dk) of a sample obtained by stacking one to four contact lenses together was measured in accordance with a measurement method based on a polarography method described in ISO 18369-4. O2 Permeometer Model 201T of Rehder Development Company was used for the measurement. The thickness of the lens(es) and a t/Dk value determined by the measurement were plotted on the x-axis and the y-axis, respectively, and the inverse of the slope of the regression line of the plot was defined as the oxygen permeability (Dk) $\{(cm^2/sec)/(mL\ O_2/(mL \times mmHg))\}$. A larger oxygen permeability (Dk) indicates more satisfactory oxygen permeability. When the oxygen permeability (Dk) was 75 or more, it was judged that the oxygen permeability was particularly satisfactory.

Example 1

Under the temperature condition of 25° C., 11.8 mass % of A-1, 11.8 mass % of MPC, and 31.5 mass % of ES were mixed and dissolved, and then 7.9 parts by mass of EGMV, 7.9 mass % of HBMA, 0.8 mass % of TEGDMA, 0.8 mass % of TEGDV, 11.8 mass % of MMA, 15.7 mass % of NVP, and with respect to 100 parts by mass in total of the foregoing, 15.0 parts by mass of HeOH were mixed and uniformly dissolved to provide a composition. The content ratios of the components are shown in Table 2.

0.5 Part by mass of AIBN was added to the composition, the mixture was poured into a cell obtained by interposing a polyethylene terephthalate sheet having a thickness of 0.1 mm as a spacer between two polypropylene plates, and the cell was placed in an oven. After the inside of the oven had been purged with nitrogen, the temperature was increased to 100° C., and the temperature was kept for 2 hours to polymerize the composition at 0 kgf/cm² (gauge pressure). Thus, a polymer of Example 1 was obtained. The polymer was removed from the cell.

Saline was prepared with reference to the literature (ISO 18369-3: 2006, Ophthalmic Optics-Contact Lenses Part 3: Measurement Methods). 8.3 g of sodium chloride, 5.993 g of sodium hydrogen phosphate dodecahydrate, and 0.528 g of sodium dihydrogen phosphate dihydrate were weighed and dissolved in water to 1,000 mL, and the solution was filtered to prepare the saline.

The above-mentioned polymer was immersed in 2-propanol for 4 hours, then immersed in ion-exchanged water for 4 hours, and further immersed in the saline described in ISO 18369-3 to produce a hydrate of the polymer. The hydrate was processed into a shape appropriate for each evaluation test, to thereby provide a contact lens sample. The results of the evaluations are shown in Table 2. The elongation at break was 250%, the oxygen permeability (Dk) was 80, the WBUT was 30 seconds or more, and the modulus was 0.5 MPa. Thus, it was recognized that the contact lens of Example 1 was satisfactory in terms of hydrophilicity, oxygen permeability, and modulus, and was excellent in elongation at break.

Examples 2 to 15, and Comparative Examples 1 and 2

Compositions, polymers, and contact lenses of Examples 2 to 15, and Comparative Examples 1 and 2 were prepared and subjected to evaluation tests in the same manner as in Example 1 except that the content ratios of the components and the polymerization conditions were changed as shown in Tables 2, 3, and 4. The results are shown in Table 2, Table 3, and Table 4.

TABLE 2

| | | | | Example 1 | Example 2 | Example 3 | Example 4 | Example 5 | Example 6 | Example 7 |
|---|---|---|---|---|---|---|---|---|---|---|
| Composition | Monomer components*[1] (mass %) | A | A-1 | 11.8 | 31.5 | | | | 31.5 | 31.5 |
| | | | A-2 | | | 31.5 | | | | |
| | | | A-3 | | | | 31.5 | | | |
| | | | A-4 | | | | | 31.5 | | |
| | | | A-5 | | | | | | | |

TABLE 2-continued

|  |  |  |  | Example 1 | Example 2 | Example 3 | Example 4 | Example 5 | Example 6 | Example 7 |
|---|---|---|---|---|---|---|---|---|---|---|
|  |  |  | A-6 |  |  |  |  |  |  |  |
|  |  | B | MPC | 11.8 | 11.8 | 11.8 | 11.8 | 11.8 | 5.9 | 11.8 |
|  |  | C | ES | 31.5 | 11.8 | 11.8 | 11.8 | 11.8 | 11.8 |  |
|  |  |  | SiGMA |  |  |  |  |  |  | 11.8 |
|  |  | D | EGMV | 7.9 | 7.9 | 7.9 | 7.9 | 7.9 | 7.9 | 7.9 |
|  |  |  | DEGMV |  |  |  |  |  |  |  |
|  |  | E | HEMA |  |  |  |  |  |  |  |
|  |  |  | HPMA |  |  |  |  |  |  |  |
|  |  |  | HBMA | 7.9 | 7.9 | 7.9 | 7.9 | 7.9 | 7.9 | 7.9 |
|  |  | F | TEGDV | 0.8 | 0.8 | 0.8 | 0.8 | 0.8 | 0.8 | 0.8 |
|  |  |  | TEGDMA | 0.8 | 0.8 | 0.8 | 0.8 | 0.8 | 0.8 | 0.8 |
|  |  |  | FM-7711 |  |  |  |  |  |  |  |
|  |  | G | MMA | 11.8 | 11.8 | 11.8 | 11.8 | 11.8 | 11.8 | 11.8 |
|  |  |  | NVP | 15.7 | 15.7 | 15.7 | 15.7 | 15.7 | 21.7 | 15.7 |
|  |  |  | DMAA |  |  |  |  |  |  |  |
|  | Total of monomers |  |  | 100.0 | 100.0 | 100.0 | 100.0 | 100.0 | 100.0 | 100.0 |
|  | Other components*[2] | H | HeOH | 15.0 | 20.0 | 20.0 | 20.0 | 20.0 | 15.0 | 20.0 |
|  | (part(s) by mass) | Initiator | AIBN | 0.5 | 0.5 | 0.5 | 0.5 | 0.5 | 0.5 | 0.5 |
| Polymerization conditions | Step 1 | Temperature (° C.) |  |  |  |  |  |  |  |  |
|  |  | Time (hours) |  |  |  |  |  |  |  |  |
|  | Step 2 | Temperature (° C.) |  | 100 | 100 | 100 | 100 | 100 | 100 | 100 |
|  |  | Time (hours) |  | 2 | 2 | 2 | 2 | 2 | 2 | 2 |
| Evaluation | CL*[3] modulus (MPa) |  |  | 0.5 | 0.4 | 0.6 | 0.3 | 0.6 | 0.6 | 0.3 |
|  | Elongation at break of CL (%) |  |  | 250 | 300 | 280 | 350 | 290 | 250 | 320 |
|  | WBUT (seconds) |  |  | >30 | >30 | >30 | >30 | >30 | >30 | >30 |
|  | Water content (%) |  |  | 55 | 50 | 40 | 60 | 45 | 40 | 55 |
|  | Oxygen permeability (Dk) |  |  | 80 | 85 | 95 | 80 | 90 | 100 | 80 |

*[1]Blending amounts of components A to G; with respect to total amount of monomer components
*[2]Blending amounts of component H and initiator; with respect to 100 parts by mass of monomer components
*[3]Contact lens

TABLE 3

|  |  |  |  | Example 8 | Example 9 | Example 10 | Example 11 | Example 12 | Example 13 | Example 14 | Example 15 |
|---|---|---|---|---|---|---|---|---|---|---|---|
| Composition | Monomer components*[1] (mass %) | A | A-1 | 31.5 | 31.5 | 30.3 | 31.5 | 31.5 | 31.5 | 31.5 | 31.5 |
|  |  |  | A-2 |  |  |  |  |  |  |  |  |
|  |  |  | A-3 |  |  |  |  |  |  |  |  |
|  |  |  | A-4 |  |  |  |  |  |  |  |  |
|  |  |  | A-5 |  |  |  |  |  |  |  |  |
|  |  |  | A-6 |  |  |  |  |  |  |  |  |
|  |  | B | MPC | 11.8 | 11.8 | 11.4 | 11.8 | 11.8 | 11.8 | 11.8 | 11.8 |
|  |  | C | ES | 11.8 | 11.8 | 11.4 | 11.8 | 11.8 | 11.8 | 11.8 | 11.8 |
|  |  |  | SiGMA |  |  |  |  |  |  |  |  |
|  |  | D | EGMV | 15.7 |  | 7.6 | 7.9 | 7.9 | 7.9 | 7.9 | 7.9 |
|  |  |  | DEGMV |  | 7.9 |  |  |  |  |  |  |
|  |  | E | HEMA |  |  |  | 7.9 |  |  |  |  |
|  |  |  | HPMA |  |  |  |  | 7.9 |  |  |  |
|  |  |  | HBMA | 7.9 | 7.9 | 22.7 |  |  | 7.9 | 7.9 | 7.9 |
|  |  | F | TEGDV | 0.8 | 0.8 | 0.8 | 0.8 | 0.8 |  | 0.8 | 0.8 |
|  |  |  | TEGDMA | 0.8 | 0.8 | 0.8 | 0.8 | 0.8 |  | 0.8 | 0.8 |
|  |  |  | FM-7711 |  |  |  |  |  | 1.6 |  |  |
|  |  | G | MMA | 11.8 | 11.8 | 7.6 | 11.8 | 11.8 | 11.8 | 11.8 | 11.8 |
|  |  |  | NVP | 7.9 | 15.7 | 7.6 | 15.7 | 15.7 | 15.7 |  | 15.7 |
|  |  |  | DMAA |  |  |  |  |  |  | 15.7 |  |
|  | Total of monomers |  |  | 100.0 | 100.0 | 100.0 | 100.0 | 100.0 | 100.0 | 100.0 | 100.0 |
|  | Other components*[2] (part(s) by mass) | H | HeOH | 20.0 | 20.0 | 20.0 | 20.0 | 20.0 | 20.0 | 20.0 | 20.0 |
|  |  | Initiator | AIBN | 0.5 | 0.5 | 0.5 | 0.5 | 0.5 | 0.5 | 0.5 | 0.5 |

TABLE 3-continued

|  |  |  | Example 8 | Example 9 | Example 10 | Example 11 | Example 12 | Example 13 | Example 14 | Example 15 |
|---|---|---|---|---|---|---|---|---|---|---|
| Polymerization conditions | Step 1 | Temperature (° C.) |  |  |  |  |  |  |  | 55 |
|  |  | Time (hours) |  |  |  |  |  |  |  | 7 |
|  | Step 2 | Temperature (° C.) | 100 | 100 | 100 | 100 | 100 | 100 | 100 | 120 |
|  |  | Time (hours) | 2 | 2 | 2 | 2 | 2 | 2 | 2 | 2 |
| Evaluation | CL*[3] modulus (MPa) |  | 0.5 | 0.3 | 0.6 | 0.6 | 0.5 | 0.6 | 0.3 | 0.5 |
|  | Elongation at break of CL (%) |  | 350 | 300 | 360 | 350 | 320 | 280 | 300 | 300 |
|  | WBUT (seconds) |  | >30 | >30 | >30 | >30 | >30 | >30 | >30 | >30 |
|  | Water content (%) |  | 45 | 55 | 40 | 55 | 53 | 40 | 45 | 55 |
|  | Oxygen permeability (Dk) |  | 95 | 85 | 80 | 80 | 85 | 95 | 85 | 90 |

*[1]Blending amounts of components A to G; with respect to total amount of monomer components
*[2]Blending amounts of component H and initiator; with respect to 100 parts by mass of monomer components
*[3]Contact lens

TABLE 4

|  |  |  |  | Comparative Example 1 | Comparative Example 2 |
|---|---|---|---|---|---|
| Composition | Monomer components*[1] (mass %) | A | A-1 | 31.5 |  |
|  |  |  | A-2 |  |  |
|  |  |  | A-3 |  |  |
|  |  |  | A-4 |  |  |
|  |  |  | A-5 |  |  |
|  |  |  | A-6 |  | 31.5 |
|  |  | B | MPC | 11.8 | 11.8 |
|  |  | C | ES | 11.8 | 11.8 |
|  |  |  | SiGMA |  |  |
|  |  | D | EGMV |  |  |
|  |  |  | DEGMV |  | 7.9 |
|  |  | E | HEMA |  |  |
|  |  |  | HPMA |  |  |
|  |  |  | HBMA | 7.9 | 7.9 |
|  |  | F | TEGDV | 0.8 | 0.8 |
|  |  |  | TEGDMA | 0.8 | 0.8 |
|  |  |  | FM-7711 |  |  |
|  |  | G | MMA | 11.8 | 11.8 |
|  |  |  | NVP | 23.6 | 15.7 |
|  |  |  | DMAA |  |  |
|  | Total of monomers |  |  | 100.0 | 100.0 |
|  | Other components*[2] (part(s) by mass) | H | HeOH | 7.9 | 7.9 |
|  |  | Initiator | AIBN | 0.8 | 0.8 |
| Polymerization conditions | Step 1 | Temperature (° C.) |  |  |  |
|  |  | Time (hours) |  |  |  |
|  | Step 2 | Temperature (° C.) |  | 100 | 100 |
|  |  | Time (hours) |  | 2 | 2 |
| Evaluation | CL*[3] modulus (MPa) |  |  | 1.0 | 1.5 |
|  | Elongation at break of CL (%) |  |  | 200 | 250 |
|  | WBUT (seconds) |  |  | >30 | >30 |
|  | Water content (%) |  |  | 40 | 35 |
|  | Oxygen permeability (Dk) |  |  | 80 | 85 |

*[1]Blending amounts of components A to G; with respect to total amount of monomer components
*[2]Blending amounts of component H and initiator; with respect to 100 parts by mass of monomer components
*[3]Contact lens As apparent from the results of Table 2 and Table 3, in each of Examples 1 to 15, the WBUT evaluation was more than 30 seconds, indicating satisfactory surface hydrophilicity, the modulus fell within the range of 0.3 MPa or more and less than 0.7 MPa, indicating a satisfactory modulus, the oxygen permeability (Dk) was 75 or more, indicating a particularly satisfactory oxygen permeability (Dk), and the elongation at break was 250% or more, indicating a satisfactory elongation at break.

Meanwhile, as apparent from Table 4, in Comparative Example 1, the component (D) was not incorporated. Consequently, the elongation at break was less than 250%, indicating a poor elongation at break, and the modulus was 0.7 MPa or more, indicating a modulus inappropriate for a contact lens.

In Comparative Example 2, A-6, which was used in place of the component (A), had an "a" in the formula (1) of less than 20. Consequently, the modulus was 0.7 MPa or more, indicating a modulus inappropriate for a contact lens.

Thus, it was recognized that the polymer obtained by polymerizing the monomer composition of the present invention was capable of producing a contact lens satisfactory in terms of surface hydrophilicity, modulus, elongation at break, and oxygen permeability (Dk).

In view of the foregoing, it was recognized that the contact lens obtained by polymerizing the monomer composition for contact lenses of the present invention was simultaneously satisfactory in terms of surface hydrophilicity, modulus, elongation at break and oxygen permeability (Dk).

INDUSTRIAL APPLICABILITY

The contact lens that is simultaneously satisfactory in terms of surface hydrophilicity, modulus, elongation at break and oxygen permeability (Dk) can be provided.

The invention claimed is:

1. A monomer composition for contact lenses, comprising the following components:
   (A) a phosphorylcholine group-containing polysiloxane monomer represented by the following formula (1);
   (B) a phosphorylcholine group-containing methacrylic monomer represented by the following formula (2);
   (C) a trimethylsiloxysilyl group-containing silicone monomer having at least one or more hydroxy groups in a molecule;
   (D) a monovinyl ether monomer having at least one or more hydroxy groups in a molecule;
   (E) one or more kinds of hydroxy group-containing monomers selected from: hydroxyethyl (meth)acrylate; hydroxypropyl (meth)acrylate; hydroxybutyl (meth)acrylate; and hydroxyethylacrylamide;
   (F) a crosslinker; and
   (G) a monomer other than the components (A) to (F),
   wherein, with respect to 100 mass % in total of all monomer components in the composition, a content ratio of the component (A) is from 10 mass % to 50 mass %, a content ratio of the component (B) is from 5 mass % to 20 mass %, a content ratio of the component (C) is from 5 mass % to 40 mass %, a content ratio of the component (D) is from 5 mass % to 40 mass %, a content ratio of the component (E) is from 5 mass % to 30 mass %, a content ratio of the component (F) is from 0.1 mass % to 15 mass %, and a content ratio of the component (G) is from 0 mass % to 50 mass %:

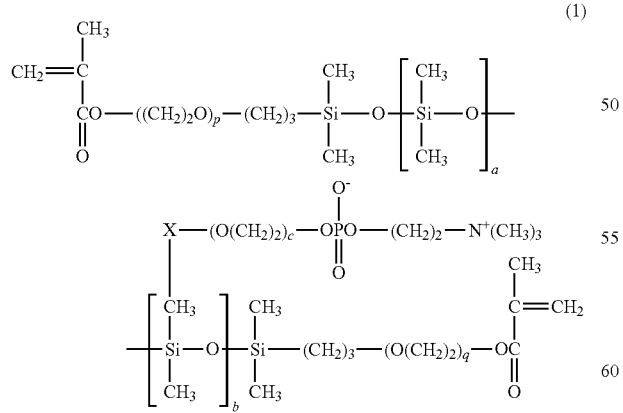

(1)

in the formula (1), "a" represents an integer of from 20 to 500, "b" represents an integer of from 1 to 70, "c" represents 0 or 1, "p" and "q" each represent 0 or 1, and X represents —CH$_2$— or —CH$_2$CH$_2$—,

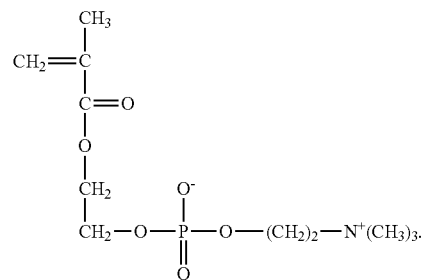

(2)

2. The monomer composition for contact lenses according to claim 1, further comprising a component (H) a solvent having a hydroxy group, wherein a content ratio of the component (H) is 30 parts by mass or less with respect to 100 parts by mass in total of all monomer components in the composition.

3. A polymer for contact lenses, comprising a polymer of the monomer composition for contact lenses of claim 1.

4. A contact lens, comprising a hydrate of the polymer for contact lenses of claim 3.

5. A method of producing a polymer for contact lenses, including a step of polymerizing the following monomer composition:

a composition including the following components:
   (A) a phosphorylcholine group-containing polysiloxane monomer represented by the following formula (1);
   (B) a phosphorylcholine group-containing methacrylic monomer represented by the following formula (2);
   (C) a trimethylsiloxysilyl group-containing silicone monomer having at least one or more hydroxy groups in a molecule;
   (D) a monovinyl ether monomer having at least one or more hydroxy groups in a molecule;
   (E) one or more kinds of hydroxy group-containing monomers selected from: hydroxyethyl (meth)acrylate; hydroxypropyl (meth)acrylate; hydroxybutyl (meth)acrylate; and hydroxyethylacrylamide;
   (F) a crosslinker; and
   (G) a monomer other than the components (A) to (F),
   wherein, with respect to 100 mass % in total of all monomer components in the composition, a content ratio of the component (A) is from 10 mass % to 50 mass %, a content ratio of the component (B) is from 5 mass % to 20 mass %, a content ratio of the component (C) is from 5 mass % to 40 mass %, a content ratio of the component (D) is from 5 mass % to 40 mass %, a content ratio of the component (E) is from 5 mass % to 30 mass %, a content ratio of the component (F) is from 0.1 mass % to 15 mass %, and a content ratio of the component (G) is from 0 mass % to 50 mass %:

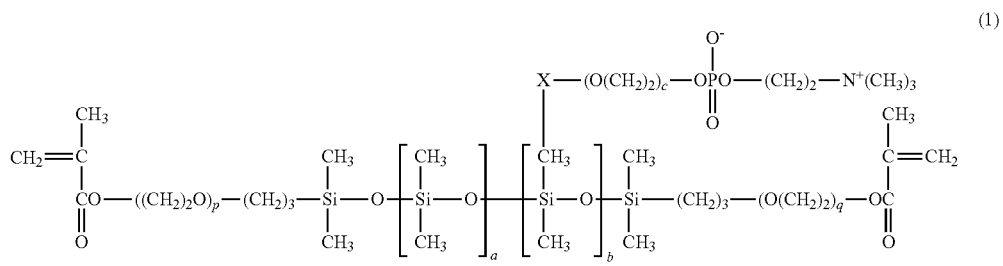

in the formula (1), "a" represents an integer of from 20 to 500, "b" represents an integer of from 1 to 70, "c" represents 0 or 1, "p" and "q" each represent 0 or 1, and X represents —$CH_2$— or —$CH_2CH_2$—,

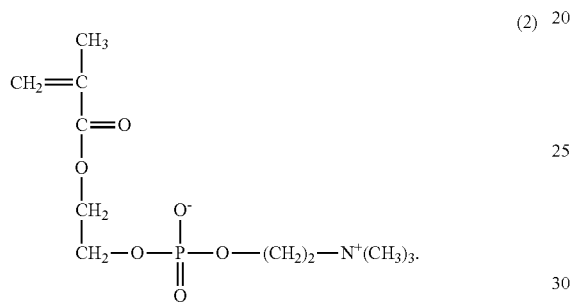

6. The method of producing a polymer for contact lenses according to claim 5, the composition further including a component (H) a solvent having a hydroxy group, wherein a content ratio of the component (H) is 30 parts by mass or less with respect to 100 parts by mass in total of all monomer components in the composition.

* * * * *

UNITED STATES PATENT AND TRADEMARK OFFICE
CERTIFICATE OF CORRECTION

PATENT NO.       : 12,180,321 B2
APPLICATION NO.  : 17/605415
DATED            : December 31, 2024
INVENTOR(S)      : Shu Takashima et al.

Page 1 of 5

It is certified that error appears in the above-identified patent and that said Letters Patent is hereby corrected as shown below:

In the Specification

Columns 3-4, Lines 25-48:
Delete:

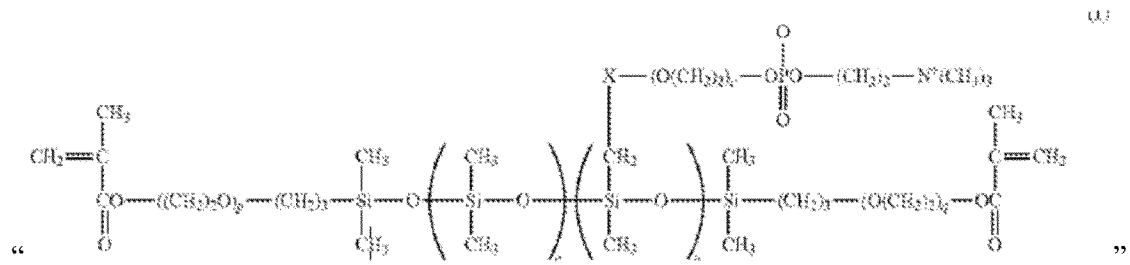

" "

Signed and Sealed this
Fifteenth Day of July, 2025

Coke Morgan Stewart
*Acting Director of the United States Patent and Trademark Office*

CERTIFICATE OF CORRECTION (continued)
U.S. Pat. No. 12,180,321 B2

Insert:

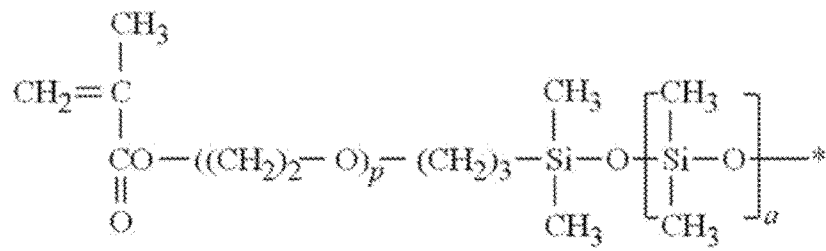
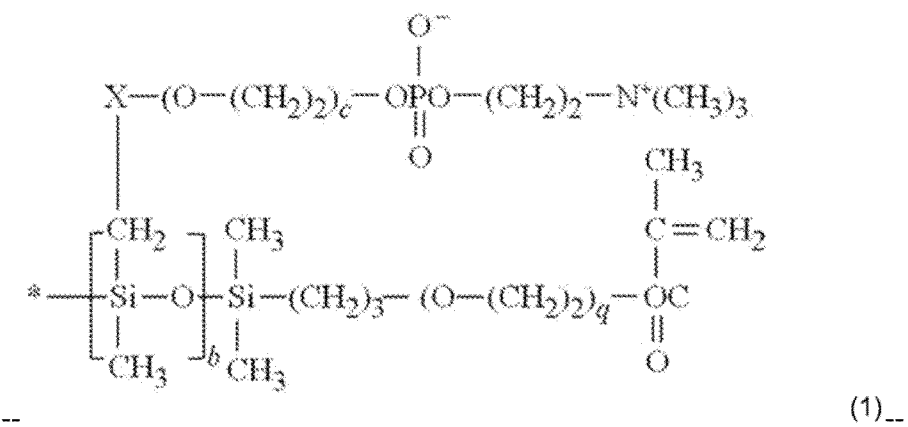

(1)

Columns 5-6, Lines 1-18, and 54+; Columns 7-8, Lines 5-18; Columns 9-10, Lines 9-32; Columns 11-12, Lines 1-13:
Delete:

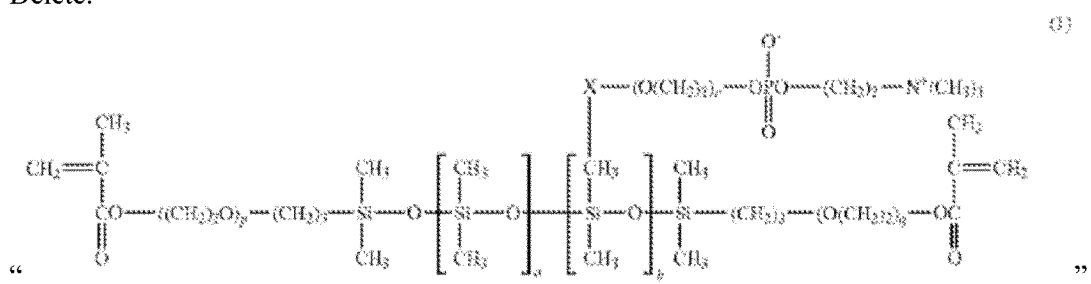

Insert:
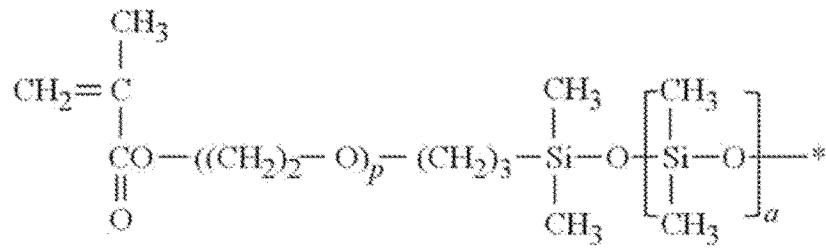
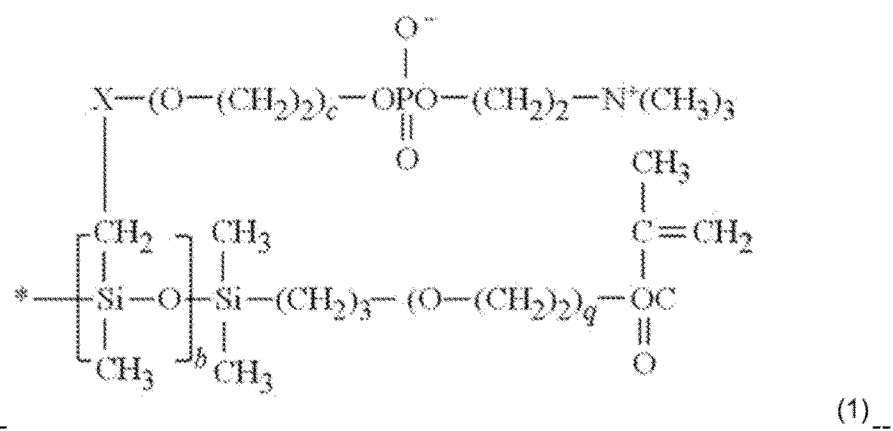
(1) --
In the Claims
In Claim 1, Column 27 at Lines 45-61:
Delete:
"
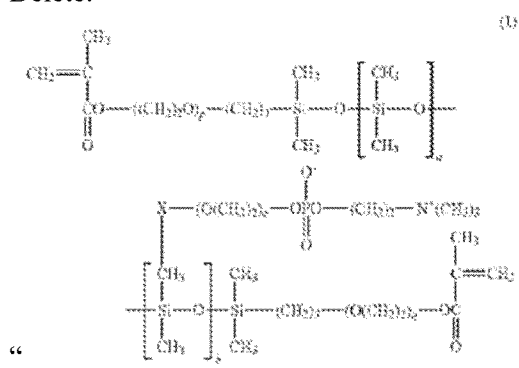
"

CERTIFICATE OF CORRECTION (continued)
U.S. Pat. No. 12,180,321 B2

Insert:

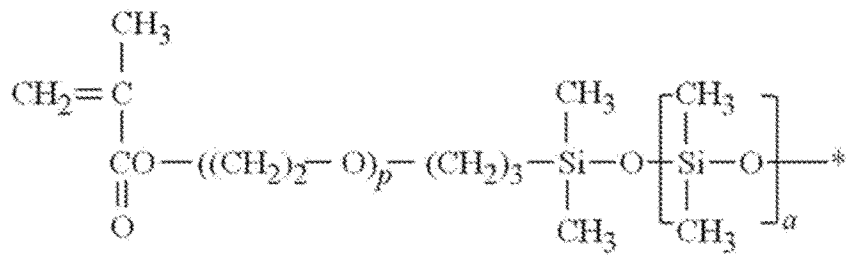

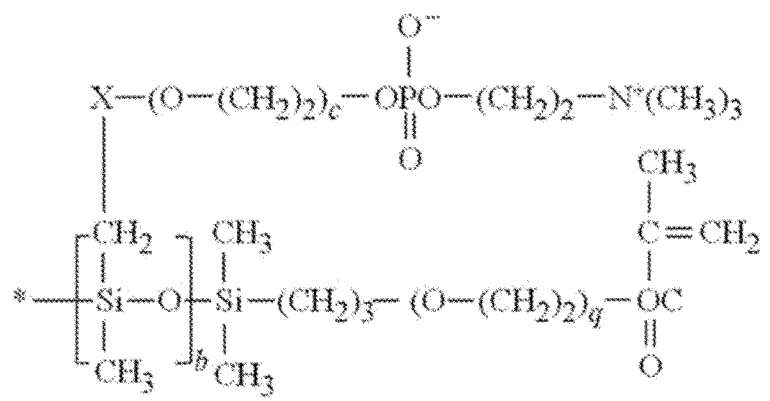

(1) --

In Claim 5, bridging Columns 29-30 at Lines 1-13:
Delete:

"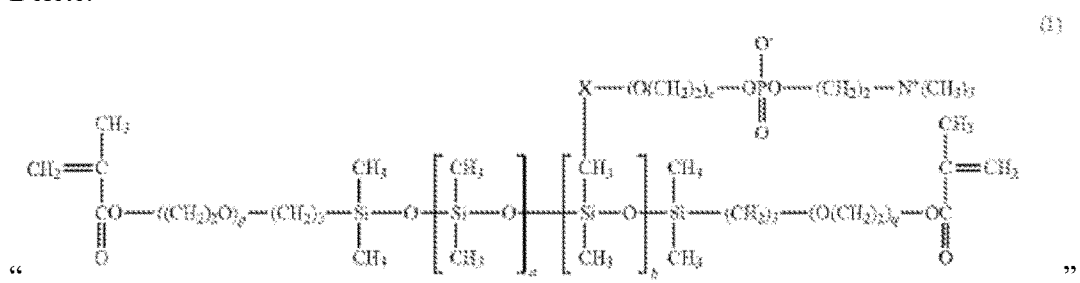"

CERTIFICATE OF CORRECTION (continued)
U.S. Pat. No. 12,180,321 B2

Insert:

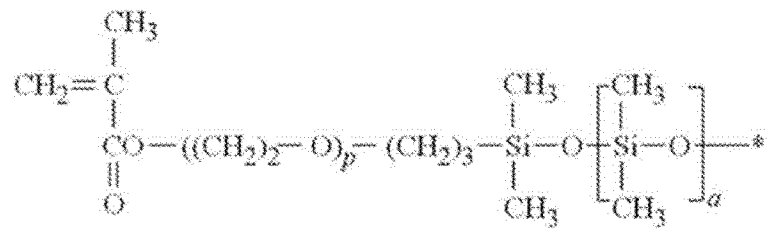

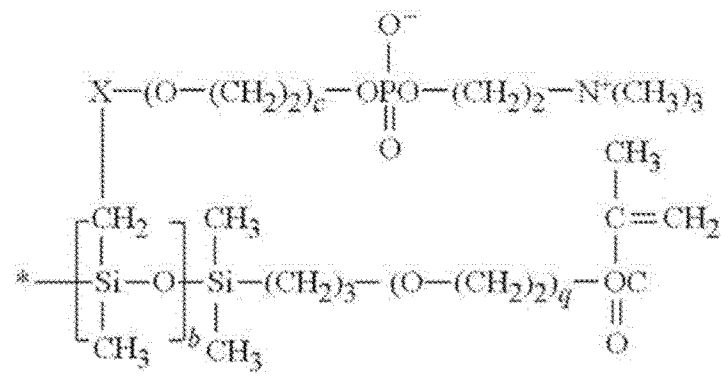

(1)